United States Patent [19]

Aggers et al.

[11] Patent Number: 5,043,722
[45] Date of Patent: Aug. 27, 1991

[54] DETECTOR FOR COLLIDING SIGNALS IN ASYNCHRONOUS COMMUNICATION

[75] Inventors: John R. Aggers, Apple Valley; Roger R. Roth, Minnetonka, both of Minn.

[73] Assignee: Honeywell Inc., Minneapolis, Minn.

[21] Appl. No.: 548,435

[22] Filed: Jul. 6, 1990

Related U.S. Application Data

[63] Continuation of Ser. No. 303,416, Jan. 30, 1989, abandoned.

[51] Int. Cl.[5] .......................... H04J 3/02; H04B 1/10
[52] U.S. Cl. ........................ 340/825.5; 340/825.54; 370/85.2; 370/85.3; 328/111; 307/520; 307/234
[58] Field of Search ............... 340/825.50, 825.51, 340/825.54; 370/85.2, 85.3, 94.1; 371/57.2, 61; 328/111, 137; 307/520, 522, 234

[56] References Cited

U.S. PATENT DOCUMENTS

| | | | |
|---|---|---|---|
| 4,063,220 | 12/1977 | Metcalfe et al. | 340/825.5 |
| 4,380,761 | 4/1983 | Boggs | 340/825.5 |
| 4,412,326 | 10/1983 | Limb | 370/85 |
| 4,472,712 | 9/1984 | Ault et al. | 340/825.5 |
| 4,489,420 | 12/1984 | Baker et al. | 375/94 |
| 4,573,045 | 2/1986 | Galin | 340/825.5 |
| 4,596,011 | 6/1986 | Kobayashi et al. | 370/85 |
| 4,638,311 | 1/1987 | Gerety | 340/825.51 |
| 4,672,325 | 6/1987 | Murai | 307/234 |
| 4,701,909 | 10/1987 | Kavehrad et al. | 370/85.3 |
| 4,710,943 | 12/1987 | Duley et al. | 371/57.1 |
| 4,719,458 | 1/1988 | Miesterfeld et al. | 340/825.5 |
| 4,885,743 | 12/1989 | Helbers et al. | 370/94.1 |

Primary Examiner—Donald J. Yusko
Assistant Examiner—Peter Weissman
Attorney, Agent, or Firm—Edward Schwarz

[57] ABSTRACT

A communications system has an active master node which transmits request messages in serial bit fashion on a data bus, and a plurality of responder nodes each of which receives the request messages on the data bus and may respond to a request message with a serial bit answer message. The possiblity exists that a plurality of responder nodes may provide concurrent answer messages forming a composite signal which the active master node may not be able to recognize as containing answer messages. A low pass filter is provided in the active master node which provides as its output only those pulses in the composite signal whose length is within a predetermined interval, typically from approximately a tenth to one half of the interval for each bit in the answer messages. A counter receives the low pass filter output and provides a collision signal to the associated master node if more than a preselected number of pulses within the predetermined interval are present. By providing the collision signal only after detecting a plurality of these pulses in the low pass filter output, it is possible to avoid false detection of concurrent answer messages whose presence is simulated by noise on the line.

7 Claims, 2 Drawing Sheets

DETECTOR FOR COLLIDING SIGNALS IN ASYNCHRONOUS COMMUNICATION

This application is a continuation of application Ser. No. 07/303,416 filed Jan. 30, 1987, now abandoned.

BACKGROUND OF THE INVENTION

Certain communication systems include at least one master node connected for electronic exchange of information and commands with a number of other nodes on a simple asynchronous data bus. A node is simply a group of electronic circuits which can generate and encode information and place it on the data bus, and decode and process information placed on the data bus by another node. Each node will also typically have some kind of link with the outside physical world, say for receiving information from some type of environmental monitor, or for providing information to or receiving commands from an operator.

A master node is one which can transmit a message absent a request from another node for the message. Master nodes may be either active or inactive. When active, they may transmit messages to other nodes. When inactive, then they may not transmit messages to other nodes. For the system which is involved here, there may be only one active master node at any time on one data bus, although different master nodes will typically become active and then inactive according to some procedure which is irrelevant here. There are typically also individual slave nodes on such a data bus which have no facility for communicating with each other and can only transmit information on the data bus upon receiving a request for it from an active master node. For the purposes of the description which follows, slave nodes and inactive master nodes, i.e. those which may receive a request for information or a command from an active master node, will be referred to as responder nodes.

The particular mode of operation of interest here is referred to as the significant event poll (SEP) mode. In this mode, an active master node transmits on the data bus an interrogation or request message which is directed to at least two of the responder nodes, and possibly even to all of them, and to which any or all of them may respond with an answer message. The answer message may confirm that a requested activity has been completed, or that the responder node has information concerning an external event, say a measure of or a change in some environmental condition. When the likelihood is small that any of the responder nodes will respond, this mode of operation has the potential of saving substantial bus use or occupancy time. There are also situations where a large number of nodes are likely to respond, say when a SEP is used to determine the presence and identity of a number of responder master nodes. This arises, for example, during system start-up, when it is useful to build a table which lists the identity of each master node on the system. Thus, in this mode it is extremely likely that instances will arise where more than one responder node will respond to the interrogation message more or less simultaneously, resulting in what is referred to as a collision of the answer messages.

There is for every message, including the answer messages, a preamble having a specific format, the corruption of which will frequently indicate that a collision or conflict has arisen. However, on occasion, the superimposed waveforms of three or more simultaneous answer message preambles will be such that the master node will not even be able to detect the presence of the start bit, and hence the existence of the answer messages. If that is the case, then the active master node will not be prompted to proceed to an alternative procedure of polling to determine which of the nodes responded to the interrogation message.

In a typical system of this type, messages are transmitted on a twisted pair data bus by differential voltage levels. The differential signaling convention used here provides that a voltage on the + conductor of the twisted pair which exceeds that on the − conductor represents a logical high/Boolean 1 condition, and the reverse voltage condition represents a logical low/Boolean 0. When no signal is being applied to the data bus, the voltage floats and is essentially indeterminate. During transmission at the typical baud or bit rate of 9600 bits per sec., each bit is represented by holding one or the other of the voltage relationships on the data bus for about 104 $\mu$sec., although, of course, other bit rates are possible. It is convenient to use, for communicating on the data bus, one of the off-the-shelf microcircuits which include in one package both a parallel-to-serial converter and a serial-to-parallel converter, commonly known as a UART (Universal Asynchronous Receiver/Transmitter). In addition, to provide proper impedance matching for sending and receiving on the data bus, a line driver transmitter and a receiver amplifier are also necessary. Any of various well-known communication driver/receivers suitable for use on a multinode data bus may be used, such as the RS-485, which is explained in more detail in *EIA Standard*, RS-485, April 1983.

To assure that the receiving node(s) will be properly synchronized so that the message will be correctly received, each byte in every message is preceded by a start bit. That is, at the start of each byte, an RS-485 line driver is designed to apply to the data bus a transition from the logical high/Boolean 1 voltage level to the logical low/Boolean 0 voltage level, and then maintain the logical low for one bit time. The end of a byte is marked by a one-bit time logical high. The first byte in a message may have this logical high which precedes the logical low in the start bit present for a number of bit times. All of the nodes of the system recognize this start bit signal waveform as preceding a byte and thus can properly synchronize themselves on the voltage transition with the transmitting node to receive the byte accurately. The duration of the signal levels in these start bit waveforms is sufficient to unequivocally distinguish them from noise pulses which may simulate the voltage levels of this waveform for brief periods of time.

For a variety of reasons, the responding nodes, when concurrently transmitting, will not provide perfectly in-phase and identical start bit waveforms, particularly with respect to the time from receipt of the interrogation message to the start bit for the first byte of the preamble. It is thus possible that neither the start bit waveforms nor any of the messages when so superimposed will be recognized by the active master node as a start bit. If the presence of a start mark in the answer message is not recognized by the active master node, then the active master node will not be prompted to initiate a poll of the responder nodes to determine which of them have answered the interrogation message. Thus, it is possible that important answer messages will be ignored by the active master node since the start-of-message waveform has been corrupted by the superimposing of several message waveforms.

This problem has been recognized in U.S. Pat. No. 4,689,786 in situations where an answer message is a certainty. In that case, the absence of an answer message can be taken to indicate a collision, which can then be resolved by specific types of retransmission. This differs from the situation here, where there may not be an answer message in response to a significant event poll interrogation message.

U.S. Pat. No. 4,063,220 discloses a system for detecting data collisions by monitoring the signal present on a data bus and comparing this signal with that which was transmitted. Differences are taken to indicate a collision. The active master node in the network to be described has no access to these original transmissions.

BRIEF DESCRIPTION OF THE INVENTION

The problem of missed or undetected colliding answer messages is solved by including in those master nodes which transmit signals which may elicit concurrent responses from other nodes additional circuitry which can detect the presence of shorter-than-normal pulses in the composite signal formed by concurrent answer messages. We have discovered that the waveform created by the composite signal will, when bit durations of around 100 μsecs. are involved, almost always include a number of individual pulses (intervals between successive transitions of the voltage between the predetermined signal levels) which are longer than approximately 10 μsecs. and shorter than approximately 50 μsecs. Similar relationships wherein pulses which are at least 10% of the length of the bit interval indicate the presence of concurrent messages, undoubtedly are true for waveforms having bit intervals longer or shorter than 100 μsecs. By sensing a number of these pulses, the presence of colliding messages can usually be detected, allowing a procedure to be initiated by the active node to resolve the collision.

The aforementioned additional circuitry may comprise a low pass filter receiving the concurrent or colliding answer messages comprising the composite signal from the data bus and providing a filtered signal comprising the answer message waveform from which have been removed all pulses having a duration below a predetermined value; and a pulse counter receiving the interrogation message and the filtered signal and incrementing an internal count value responsive to each pulse in the filtered signal, and supplying a collision signal upon the internal count value reaching a predetermined value, and further, clearing the internal count value responsive to the interrogation message. The low pass filter may be a resistor-capacitor integrator chosen to provide an output crossing the threshold of the counter input each time a pulse within the composite signal attains a duration of at least 10% of the bit interval in the individual answer messages.

Accordingly, one purpose of the invention is to allow simultaneous polling of a plurality of nodes on a communication data bus with small chance of incorrect performance by the system.

Another purpose is to detect collisions between a plurality of messages sent in response to an interrogation or request message.

Yet another purpose is to determine existence of a network condition requiring a procedure of more individualized polling of the network's nodes.

DETAILED DESCRIPTION OF THE INVENTION

Figure 1:
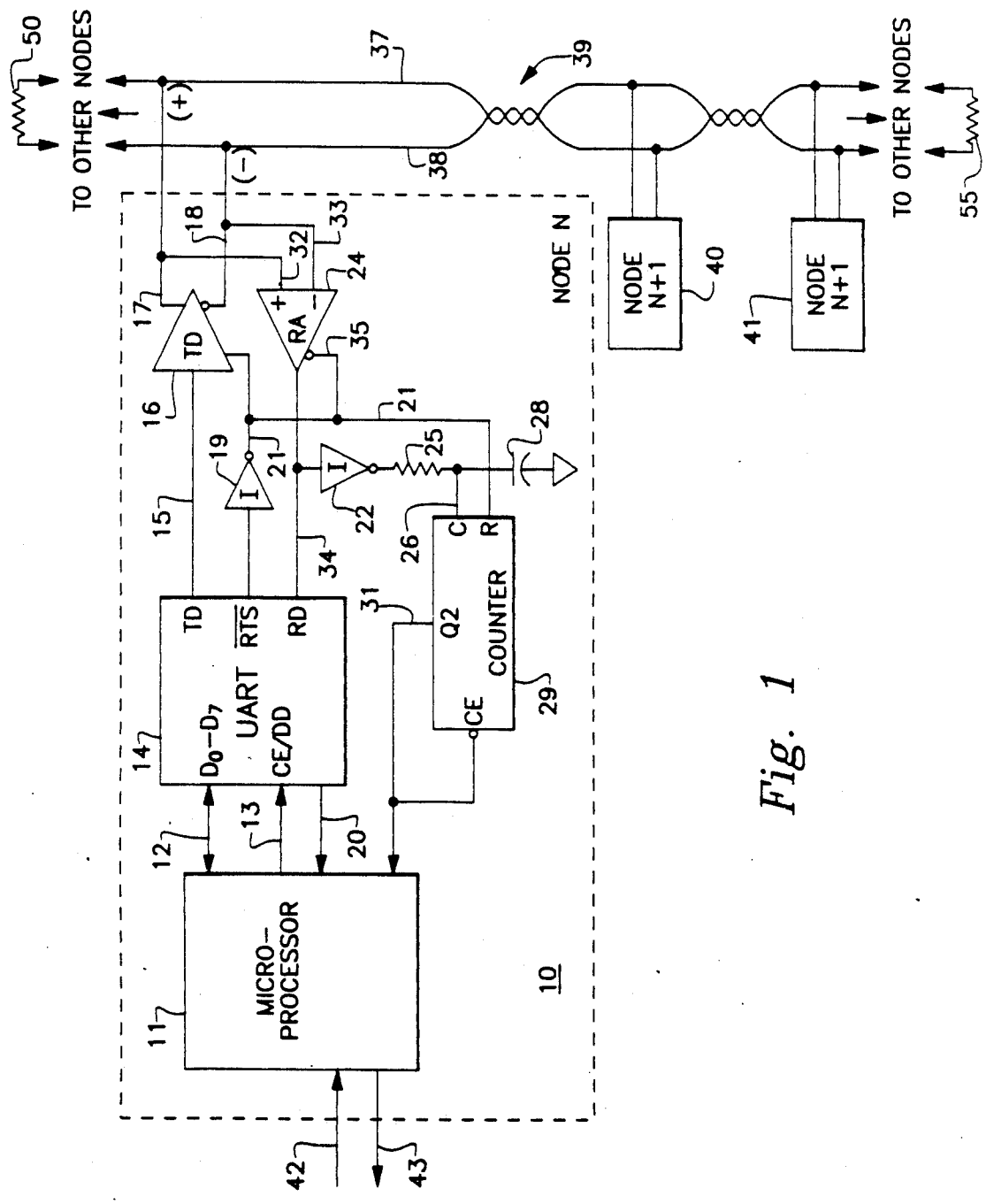
FIG. 1 is a block circuit diagram of the invention as implemented in a node of the communication system.

FIG. 1 is a functional block/circuit diagram of a typical communication network for which the invention being described is an improvement. Node N, having reference number 10, is also typical of node N+1 40, node N+2 41, or any node which must detect collisions between two or more concurrently transmitted messages on network 39. Each of these nodes 10, 40, and 41 comprises typically a microprocessor 11 which communicates with external devices via an input data path 42 and an output data path 43. Path 42 may connect to external devices such as switches, devices for measuring quantities whose output is digitally encoded, or keyboards and other man-machine input interfaces. Signals provided on path 43 can comprise commands to external devices such as servomotors, voice coils, or any of various types of display units or data loggers.

A node 10 also can communicate with other nodes 40 and 41 via a twisted pair data bus 39 comprising a first conductor 37 designated the + conductor and a second conductor 38 designated the − conductor. On such a twisted pair data bus 39, it is necessary that data be transmitted serially, that is individual bits follow each other in designated time slots or at a designated rate. The twisted pair design is preferable to a single conductor path with ground return because of its vastly superior noise immunity. Nonetheless, this invention is also applicable to single conductor networks.

Figure 2:
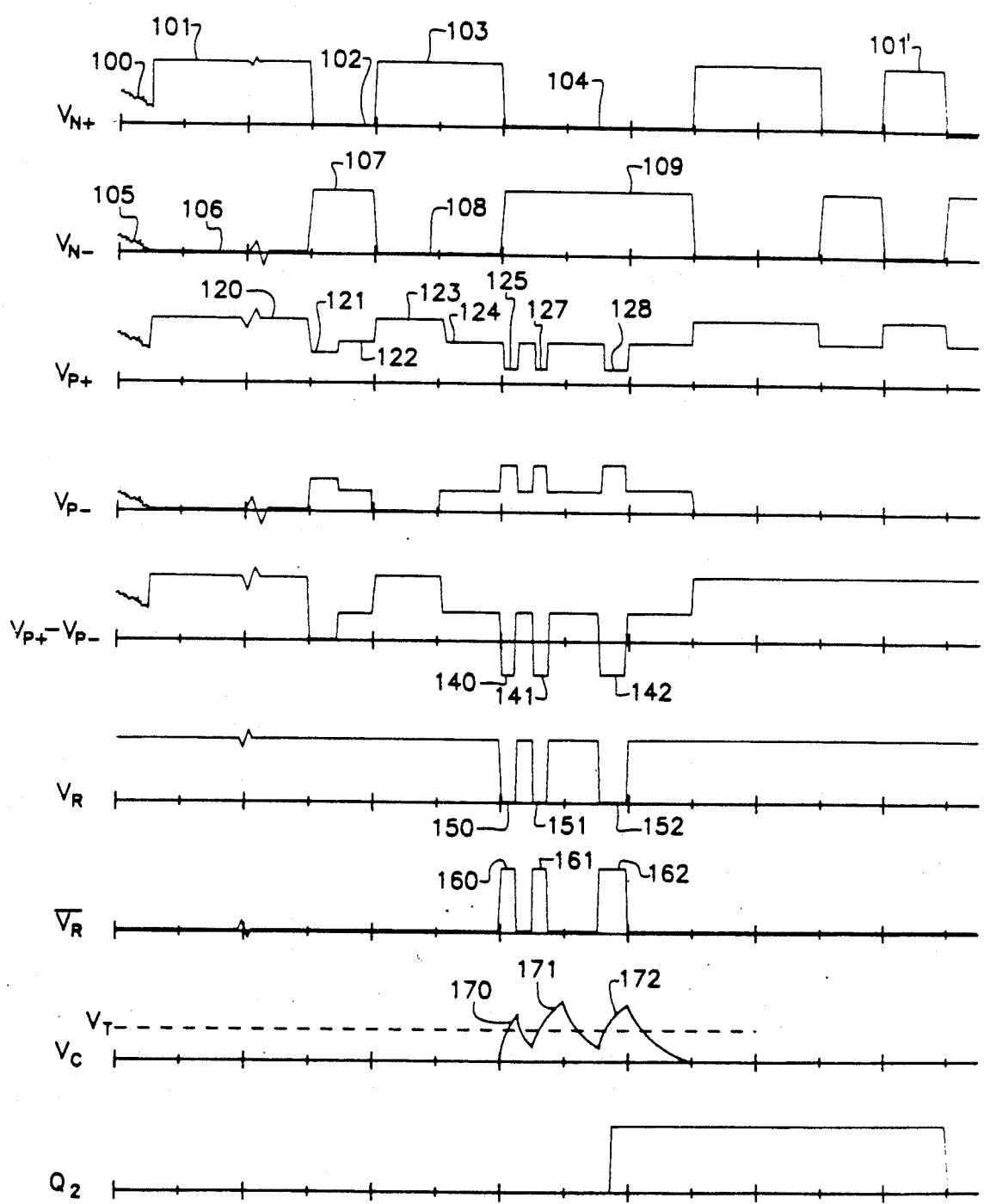
FIG. 2 shows sketches of a number of waveforms useful in understanding the way in which the invention detects a message collision.

Microprocessors such as unit 11 typically process data in 8 or 16-bit parallel. Therefore, it is necessary to convert this parallel data into a serial format for transmission on the twisted pair communication path 39, and this is accomplished by UART (universal asynchronous receiver transmitter) circuit 14 in conjunction with a transmitter driver 16 and a receiver amplifier 24. These devices are very commonly used in the electronic communication industry as part of the RS-485 party line communications protocol. The driver 16 generates on twisted pair communication bus 39 a differential type of signal where the voltage waveform on conductor 38 mirrors the waveform carried on conductor 37. Referring to FIG. 2 as an example of this, the waveform designated $V_{N+}$ is carried on + conductor 37, and the waveform carried on conductor 38 is designated $V_{N-}$. When no transmitter driver 16 is active, waveform portions 100 and 105 indicate an indeterminate voltage left over in line capacitance charge during earlier signal transmissions and which slowly discharges through terminating resistors 50 and 55. The mirror image characteristics of the signals on conductors 37 and 38 is shown in FIG. 2 where waveform portion 101 is mirrored by waveform portion 106, waveform portion 102 is mirrored by waveform 107, and waveform portions 103 and 104 are mirrored respectively by waveform portions 108 and 109. For simplicity's sake, it may be assumed that the voltage represented by waveform portions 101, 103, 107, and 109 all have levels of 5 volts, which is a common level, and waveform portions 102, 104, 106, and 108 all represent approximately 0 volts, which too is common. Further, for illustrative purposes, the time interval between the large hash marks on the abscissa of each waveform plot can be taken to represent 208 μsecs., and the small hash marks between each pair of large hash marks can be taken to represent 104 μsec. intervals between the large hash marks, these values being chosen as consistent with the standard data rate of 9600 baud for these types of communication networks, where each bit occupies 104 μsecs. Further, the break in waveforms 101 and 106 represent an additional indeterminate passage of time, so that each of waveforms of 101 and 106 may have a typical duration of perhaps several hundred microseconds.

UART 14 communicates with microprocessor 11 on an 8-bit parallel data path 12. The transmission is controlled by a control signal path 13 which includes at least two individual paths, one for chip enable (CE) and another for data direction (DD). Microprocessor 11 signals to UART 14 that a data transmission should occur by providing a chip enable signal on path 13 along with a data direction signal which specifies whether the UART is to transmit an 8-bit byte to microprocessor 11 on path 12 or that microprocessor 11 will be transmitting an 8-bit byte to UART 14.

Once UART 14 has an 8-bit byte stored in it, then, in a typical design, the UART 14 provides a request to transmit signal ($\overline{RTS}$) to inverter 19 which is transmitted to both driver 16 and receiver-amplifier 24. When data transmission is desired, then UART 14 provides an output voltage through inverter 19 on path 21 which is at a preselected level which specifies this function. UART 14 converts the parallel 8-bit byte on data path 12 into a waveform of individual serial logic levels representing sequential bits, which are provided at 104 μsec. intervals to driver 16 o path 15. Driver 16 then applies the appropriate voltages as indicated during the discussion of FIG. 2 to paths 17 and 18 which drives conductors 37 and 38 so as to provide a signal voltage on the twisted pair communication path 39.

There is the requirement mentioned earlier for each 8-bit byte of serial data to be preceded by a start bit. In FIG. 2, the start bit in waveform $V_{N+}$ is at least 104 μsecs. of continuous high level at the trailing part of portion 101 followed by the transition from high to low between waveform portions 101 and 102 and then by the low level of waveform portion 102, which portion normally occupies 104 μsecs. The first byte in a message is preceded by a start bit whose high level portion is at least 10 bit times long. Each byte of data is immediately followed by an end bit which is a logical high one bit time long, as shown by portion 101'. It should be understood, of course, that the mirror image of the start bit is represented by the $V_{N-}$ waveform of FIG. 2 and carried on − conductor 38 as indicated by waveform portions 106 and 107. Since the nominal length of portion 102 is, by definition, the one-bit interval time of 104 μsecs., as shown by waveform portion 102 in FIG. 3, even substantial deviations from the nominal will not affect the ability of other nodes, such as node N+1 40 and node N+2 41, to detect the presence of a start bit. After the start bit has occurred, then data bits for a complete 8-bit byte represented by waveform portions 103 and 108 for bits 1 and 2, portions 104 and 109 for bits 3-5, etc. are issued by driver 16. If a high for waveform $V_{N+}$ represents a binary 1, then the $V_{N+}$ and $V_{N-}$ waveforms represent binary 11000110. The start bit indicates to and provide a synchronizing for other nodes receiving the byte which follows.

Receiving of a signal carried on the data bus 39 begins with the receiver amplifier 24 which receives the voltage signals at its + and − inputs via conductors 32 and 33 respectively connected to data paths 37 and 38. Amplifier 24 is enabled by setting the control signal on path 21 to the opposite or inverse level of that which enables driver 16. Thus, driver 16 and amplifier 24 are never simultaneously enabled, and it should be understood that at least three nodes are always involved in a collision, two transmitting and one receiving. Amplifier 24 is a differential two-level amplifier, meaning that the output on data path 34 is a first level when the voltage on the + terminal of amplifier 24 supplied by path 32 is more positive than the voltage on its − terminal carried on path 33 and a second level otherwise. Thus whenever $V_{N+}$ exceeds $V_{N-}$, such as is shown during waveform portions 101 and 106, the output $V_R$ of amplifier 24 has the first one level. For the amplifier 24 shown and the discussion following, this level may be considered to be a high or more positive voltage than the second level and, for ease of understanding, will be assumed to be 5.0 v. hereafter.

When the voltage level on path 32, supplied to the + input terminal of amplifier 24, becomes more negative than that supplied on path 33 to the − input terminal of amplifier 24, then its output voltage changes to the second level. The second level can be considered to be a relatively low voltage, hereafter assumed to be 0 v. It should be mentioned that amplifier 24 maintains its current output level until the differential of the voltages applied to its + and − terminals not only cross but, in fact, achieves a certain small voltage difference of the opposite sign. That is, the transition of the output from, say, high to low occurs when the difference in voltages $V_{N+}$ and $V_{N-}$ is such that $V_{N-}$ is a few tenths of a volt, say 0.2 v., greater than the voltage of $V_{N+}$.

One should understand that each node 10, 40, 41, etc. includes a UART 14 and the associated transmitter driver 16 and receiver amplifier 24, all of which function in precisely the same fashion as just described. However, because of well-known manufacturing tolerances, aging, power supply differences, and other effects as well, typical drivers 16 will not provide identical voltage levels either when transmitting a high or when transmitting a low, and this is true on either the + output terminal 17 or the − output terminal 18. Similarly, receiver amplifier 24 may vary from one node to another as far as its sensitivity to the voltage differential provided to its + and − inputs is concerned. For example, one particular amplifier 24 may change output states on path 34 when the + terminal input voltage crosses the − terminal input voltage by more than 0.2 volt. For other amplifiers, this cross-over point where output changes may be 0.15 volt or 0.25 volt. This characteristic of these drivers and amplifiers is an important motivation for use of the invention forming the subject of this description.

The so-called "collision" of signals concurrently transmitted by the drivers 16 in three different nodes is illustrated in FIG. 2 by the composite signal represented by the $V_{P+}$ and the $V_{P-}$ waveforms. For the sake of simplicity, it is assumed that data path 39 acts as a voltage divider, so that the voltage on the input terminals of an amplifier 24 is an average of the output voltages of all the active drivers 16 on the path 39. One of the drivers 16 contributing to $V_{P+}$ and $V_{P-}$ waveforms has, combined with other driver outputs, the output waveforms $V_{N+}$ and $V_{N-}$. The other waveforms have phases representing their start bits and information and content different from $V_{N+}$ and $V_{N-}$. This is a realistic assumption, although when many drivers 16 are simultaneously active, the composite waveform on path 39 becomes very complex. Thus, in waveform $V_{P+}$, portion 120 represents a situation where all of the drivers 16 are producing high level outputs. Waveform portion 121 can represent a condition where there are two active drivers 16, one of which is producing a high and the other a low level output, and the average is midway between the high and low levels. Portion 122 can represent a condition of three active drivers 16, one of which is producing a low (0 v.) level and the other two drivers are producing high level (5 v.) outputs, the average of these three outputs being 3.3 v. Portions 125, 127, and 128 are representative of conditions where two drivers are presenting active low voltage outputs, and a single driver is presenting an active high to path 39, and the voltage achieved is 1.7 volts. Waveform $V_{P-}$ is again a mirror image of the waveform $V_{P+}$, so that the sum of both waveform levels at any time equals 5 v.

The differential voltage is shown by waveform $V_{P+} - V_{P-}$. Even though there are actual start bits in the constituent driver output waveforms, it can be seen by analysis of composite differential waveform $V_{P+} - V_{P-}$ that none of these qualify as bona fide start bits because the differential voltage carried on conductors 37 and 38 does not cross the 0 v. baseline for the 52 $\mu$sec. interval necessary to qualify as a start bit. For example, in waveform $V_{P+} - V_{P-}$, negative-going pulses 140 and 141 each maintain their negative value for approximately 25 $\mu$secs. each which is an insufficient length of time to qualify as a start bit. Even pulse 142 maintains the negative differential voltage value for around 35 $\mu$secs., and this is very likely to be an insufficient amount of time to assure that a start bit will be recognized by UART 14.

The negative-going pulses 140, 141, and 142 of waveform $V_{P+} - V_{P-}$ do, however, cause transitions in the output of amplifier 24 represented in waveform $V_R$, as shown as pulses 150, 151, and 152 where the level changes correspond to the zero crossing by the differential waveform $V_{P+} - V_{P-}$. While the duration of the low signal levels of waveform $V_R$ are not sufficient to allow UART 14 to identify them as start bits, there is sufficient information content in them to allow an appropriately designed circuit to identify the presence of messages on data bus 39. In general, it has been our experience that the presence of a number of individual low signal portions 150, 151, and 152 in the signal having waveform $V_R$ which have approximately 10% or more of the nominal duration of the low portion of a start bit is a convenient means for establishing the presence of colliding signals from a number of individual nodes.

To accomplish this, there is provided an inverter 22 receiving the output on path 34 from amplifier 24, and whose output is shown as waveform $V_R$. The output of inverter 22 has high and low levels of 5 and 0 v. respectively, and is applied to capacitor 28 through resistor 25. When waveform portions 160, 161, and 162 are present in the signal from inverter 22, each causes the capacitor 28 to charge toward the 5 v. level, the voltage across it increasing as shown in voltage waveform $V_C$. Waveform $V_C$ shows this capacitor voltage to cross a threshold voltage $V_T$ of approximately 2.5 v. approximately 10 $\mu$secs. after the leading edge of each of the waveform portions 160, 161, and 162.

A pulse counter 29 performs the task of identifying and accumulating the number of low-going pulses in the signal of waveform $V_R$ where durations exceed approximately 10% of the nominal duration for the low level portion of a start bit. Counter 29 has a reset terminal connected to path 21, a clock terminal (C) by path 26 connected between resistor 25 and capacitor 28 to receive the voltage across capacitor 28, a CE (clock enable) input receiving the $Q_2$ output of counter 29 provided on path 31. Path 31 is further connected to an input of microprocessor 11 to provide to it an indication of some predetermined condition to microprocessor 11 allowing it to deal with the condition. The $Q_2$ output of counter 29 becomes high when a predetermined counter value within counter 29 is achieved. This value applied to the CE input locks counter 29 at the current count value. A signal applied to the R terminal of counter 29 causes counter 29 to be cleared. Thus, each transmission of a message by node 10 clears counter 29. The C, or clock, terminal of counter 29 causes the contents of counter 29 to increment by one each time the signal on path 26 transits from low to high across the level $V_T$, or 2.5 v. for counter 29 in our preferred embodiment, as is shown for the leading edge of waveform portion 170, 171, etc. of waveform $V_C$. The internal design of counter 29 is such that it provides a high level $Q_2$ output signal on path 31 after there have been three positive-going transitions of the signal on path 26 across voltage level $V_T$. A group of such transitions are shown by waveform portions 170, 171, and 172, each of which advances the internal count value in counter 29 by one. Once three counts have been accumulated in this internal register, the collision signal on path 31 goes high, which disables the CE input to counter 29 preventing any further incrementing. The signal on path 26 is a filtered signal which includes only pulses whose deviations in amplifier 24 output are at least about 10 $\mu$secs. It is also possible to generate the collision signal for anywhere from two through 10 counts by counter 29 if more or less sensitivity to noise is desirable.

The threshold voltage $V_T$ for the count input of counter 29 must be compatible with inverter 22, resistor 25, and capacitor 28, and with the minimum detectable pulse width desired. For a counter with a threshold $V_T$ of 2.5 volts and an inverter 22 high level output of 5.0 volts, and further having an output impedance of 50-100 ohms, an appropriate value for resistor 25 is 10,000 ohms and for capacitor 28 is 0.001 $\mu$fd. if pulse widths in excess of 10 $\mu$secs. are to be detected and those with shorter widths ignored.

It can thus be seen that this circuit comprises a low pass filter detecting the presence of negative differentials applied to the + and − inputs of amplifier 24, which have durations in excess of about 10 $\mu$secs. Resistor 25 and capacitor 28 comprise a low pass filter which rejects pulses in the signal on path 21 whose duration is less than about 10 $\mu$secs., or approximately 10% of the nominal duration for a bit interval. We have determined that when collisions are present on a data bus 39, in the vast majority of situations there will be at least three of these 10-52 $\mu$sec. pulses produced at some time during the concurrence of the signals even when there is no pulse of duration less than 52 $\mu$secs. in any of the individual signals. By signaling this condition to microprocessor 11, it is possible to resolve collisions through polling techniques wherein individual nodes generating the interrogation messages can address messages sequentially to one or a selected group of the nodes in the network. By limiting the number of addressed nodes, it is possible to eventually eliminate all but one of the responding nodes at which time a response to such a message will not involve a collision.

It should be noted that the functions described above can be implemented with an infinite number of variations. Signal levels may have any desired values simply by choice of the circuitry. The pulse durations may be different in other applications. The component values may be varied at the pleasure of the designer. Even the voltage and signal relationships may be inverted, so that say a Boolean 1 is represented by a voltage of −1 v., and a Boolean 0 is represented by a voltage of +2.5 v. In every one of these cases, it is possible to redesign the circuit by applying well-known electrical design principles.

The low pass filter of this design is somewhat imprecise, particularly in view of the differing characteristics of driver 1 and amplifier 24. If greater precision is desired, one may use another design. The rationale for choosing the one described is adequate performance, cheapness, and compactness.

What is claimed is:

1. In a communication system having an active master node and a plurality of responder nodes all connected by a single data bus, said active master node of the type transmitting on the data bus to the responder nodes an interrogation message comprising an electrical signal having a varying voltage, and each responder node of the type responsive to the interrogation message and an internal condition, transmitting on the data bus to the active master node an answer message comprising an electrical signal waveform having a plurality of voltage changes between two predetermined levels, each said answer message voltage change occurring only approximately at the end of consecutive intervals of predetermined length, and each said answer message from each responder node further having a predetermined preamble pattern beginning with a start bit comprising the maintenance of one voltage level for a predetermined interval and then a change from that one to the other level and the maintenance of the other level for a predetermined interval, the active master node detecting the presence of an answer message by detecting the presence of a start bit, an improvement in the active master node for providing a collision signal responsive to detecting from a plurality of responder nodes concurrent answer messages creating a composite data bus voltage waveform, the improvement comprising:

a) a low pass filter receiving at least portions of only the composite data bus voltage waveform created on the data bus by the concurrent answer messages from the responder nodes and providing a filtered signal comprising the data bus voltage waveform from which have been removed all pulses having a duration below a predetermined value, which predetermined value is not greater than 50% of the predetermined interval length and not smaller than 10% of the predetermined interval length; and b) a pulse counter receiving the interrogation message and the filtered signal, and incrementing an internal count value responsive to pulses in the filtered signal, and supplying the collision signal upon the internal count value reaching a predetermined value, and further, clearing the internal count value responsive to the interrogation message.

2. The system of claim 1, wherein the low pass filter includes a resistor in series connection with a capacitor, and wherein the resistor receives portions of composite data bus signal voltage and conducts it to the capacitor, and wherein the filtered signal is provided at the connection point between the resistor and the capacitor.

3. The system of claim 2, wherein the resistor has a value of approximately 10,000 ohms and the capacitor has a value of approximately 0.001 microfarad.

4. The system of claim 1, wherein the pulse counter provides the collision signal responsive to the pulse counter's internal count value reaching three.

5. The system of claim 4, wherein the low pass filter is of the type which removes pulses in the composite data bus signal of duration less than approximately 10 $\mu$secs.

6. The system of claim 1, wherein the low pass filter is of the type which removes pulses in the composite data bus signal of duration less than approximately 10 $\mu$secs.

7. The system of claim 1, wherein the pulse counter provides the collision signal responsive to the pulse counter's internal count value reaching a predetermined value, said predetermined value at least two, and not more than 10.

* * * * *